UNITED STATES PATENT OFFICE.

GEORGE F. BENKERT, OF PHILADELPHIA, PENNSYLVANIA, AND LUIGI G. MARINI, OF WASHINGTON, DISTRICT OF COLUMBIA.

REMEDY FOR CORNS, BUNIONS, &c.

SPECIFICATION forming part of Letters Patent No. 266,079, dated October 17, 1882.

Application filed March 15, 1882. (No specimens.)

*To all whom it may concern:*

Be it known that we, GEORGE F. BENKERT and LUIGI G. MARINI, citizens of the United States, residing at Philadelphia, Pennsylvania, and Washington, District of Columbia, respectively, have invented certain new and useful Improvements in Remedies for Corns, Bunions, &c.; and we do hereby declare the following to be a full, clear, and exact description of the invention, such as will enable others skilled in the art to which it appertains to make and use the same.

The object and nature of our invention is to ameliorate and cure bunions, corns, and the like by the direct application to the parts affected of a medical compound to be hereinafter described.

In carrying out our invention we take as a base two and one-half pounds of fine soft india-rubber, with which we combine seven drams of gum-tragacanth, one dram of alcohol, two grains of aconitia, ten grains subacetate of copper, more or less, as occasion may require, regard being had to the severity of the various cases to be treated. In the admixture of said ingredients we so combine them as to render the compound resulting therefrom soft and pliable, so that it may be given any desired permanent shape to meet the conformation of the part of the foot to be treated. In the application thereof the same, when so shaped, is placed over or around the bunion, corn, &c., and held in position by the stocking or by any other suitable bandage or appliance which will keep the said medicated rubber in position, with a view to reduce inflammation and effect a cure by continued contact with such sore parts of the foot.

Having thus fully described our invention, what we claim, and desire to secure by Letters Patent, is—

The combination or mixture consisting of soft fine india-rubber with gum-tragacanth, aconitia, subacetate of copper, and alcohol, in about the proportions described.

In testimony whereof we affix our signatures in presence of two witnesses.

GEO. F. BENKERT.
LUIGI G. MARINI.

Witnesses:
JAS. A. SAMPLE,
WARREN C. STONE.